US005627217A

United States Patent [19]
Rilling et al.

[11] Patent Number: 5,627,217
[45] Date of Patent: May 6, 1997

[54] INTERFACIAL POLYMERIZATION IN A POROUS SUBSTRATE AND SUBSTRATES FUNCTIONALIZED WITH PHOTOCHEMICAL GROUPS

[75] Inventors: Ken Rilling; James Dickson, both of Hamilton; Ronald Childs, Dundas, all of Canada; David R. Gagnon, St. Paul, Minn.

[73] Assignee: Minnesota Mining and Manufacturing Company, St. Paul, Minn.

[21] Appl. No.: 536,044

[22] Filed: Sep. 29, 1995

Related U.S. Application Data

[63] Continuation of Ser. No. 84,891, Jun. 29, 1993, abandoned.
[51] Int. Cl.$^6$ .............................. B01D 39/14; C08J 9/00
[52] U.S. Cl. .................. 521/50; 210/490; 210/500.26; 210/500.27; 210/500.29; 210/500.37; 210/500.38; 210/500.39; 210/500.41; 210/500.42; 210/500.43; 521/50.5; 522/1; 522/8
[58] Field of Search .......................... 522/1, 8; 521/50, 521/505; 210/490, 500.26, 500.27, 500.29, 500.37, 500.38, 500.39, 500.41, 500.42, 500.43

[56] References Cited

U.S. PATENT DOCUMENTS

| | | |
|---|---|---|
| 4,173,475 | 11/1979 | Chandross et al. |
| 4,187,111 | 2/1980 | Chandross et al. |
| 4,277,344 | 7/1981 | Cadotte. |
| 4,784,736 | 11/1988 | Lonsdale et al. |
| 4,802,984 | 2/1989 | Waite ................................ 210/500.37 |
| 4,917,800 | 4/1990 | Lonsdale et al. |
| 4,987,032 | 1/1991 | Miyasaka et al. ....................... 428/411 |
| 5,015,380 | 5/1991 | Sundet ................................ 210/500.38 |
| 5,049,275 | 9/1991 | Gillberg-LaForce et al. .......... 210/500 |
| 5,173,335 | 12/1992 | Arthur ................................ 210/500.37 |
| 5,209,849 | 5/1993 | Hu et al. ................................ 210/490 |

FOREIGN PATENT DOCUMENTS

| | | |
|---|---|---|
| 0460769A1 | 12/1991 | European Pat. Off. |
| WO85/01222 | 3/1985 | WIPO. |
| WO89/00593 | 1/1989 | WIPO. |
| WO91/01791 PCT/US91/ | 2/1991 | WIPO. |
| 07686 | 10/1991 | WIPO. |
| WO92/05595 | 4/1992 | WIPO. |

OTHER PUBLICATIONS

Chadda et al., Journal of Applied Polymer Science, V 34, Dec. 1987,32 pp. 2713–2732.

M. Ulbricht and G. Hicke, "Photo–Modification of Ultra–Filtration Membranes I: Photochemical Modifications of Polyacrylonitrile Ultrafiltration Membranes and Acrylazides", Die Angewandte Makromolekular Chemie, 210 69–75 No. 3644 (translation) Dec. 1993.

Bradbury, J.H., "The Theory of Shrinkproofing of Wool, Part VI: Identification by Light Microscopy of Scale Masking and Spot Welding of Fibers by Polymer Deposits", *Textile Research Journal*, Oct. 1963, pp. 824–828.

Whitfield, R.E., Miller, L.A. and Wasley, W.L., "Wool Fabric Stabilization by Interfacial Polymerization. Part I: Polyamides, " *Textile Research Journal*, Aug. 1961, pp. 704–712.

Reiser, Arnost, "Photoreactive Polymers, The Science and Technology of Resists", John Wiley * Sons, New York, pp. 102–114 Dec. 1989.

Fouassier, J.P., "Polymerization Photoinitiators: Excited State Processes and Kinetic Aspects", *Progress in Organic Coatings*, vol. 18 pp. 229–237 Dec. 1990.

Wayne, R.P., "Principles and Applications of Photochemistry", Oxford University Press, 1988, pp. 219–221 Dec. 1988.

Takemoto, K., Inaki, Y. and Ottenbrite, R.M., "Functional Monomers and Polymers, Procedures, Synthesis, Applications", Marcel Dekker, Inc., New York, pp. 237–263 Dec. 1987.

Chadda, S.K., McCarry, B.E., Childs, R.F., Rogerson, C.V., Tse–Sheepy, I.O. and Dickson, J.M., "Novel Thin–Film Composite Membranes Containing Photoreactive Groups Part I: Choosing the Photoreactive Group", *Journal of Applied Polymer Science*, vol. 34, pp. 2713–2732 Dec. 1987.

Wittbecker, E.L., and Morgan, P.W., "Interfacial Polycondensation. I.", *Journal of Polymer Science*, vol. XL, pp. 289–296 Dec. 1959.

*Primary Examiner*—James J. Seidleck
*Assistant Examiner*—John M. Cooney, Jr.
*Attorney, Agent, or Firm*—Gary L. Griswold; Walter N. Kirn; Roger R. Tamte

[57] ABSTRACT

A method of preparing a porous article is provided. The method includes: contacting a porous substrate with a first reactant that enters pores of the substrate; and contacting the porous substrate bearing the first reactant with a second reactant that is capable of reacting with the first reactant in an interfacial polymerization reaction; the amounts of first and second reactant being selected such that there occurs no, or substantially no, closing of pores of the substrate by the formed polymer. The invention also provides a porous article bearing a compound which is photochemically reactive and capable of undergoing a substantially non-reversible chemical transformation upon exposure to ultraviolet, visible or near infra-red irradiation. The photochemically reactive compound can be derivatized by irradiation and further reaction to provide a wide variety of useful membranes, for example, for microfiltration or for biochemical reactions and separations.

12 Claims, No Drawings

INTERFACIAL POLYMERIZATION IN A POROUS SUBSTRATE AND SUBSTRATES FUNCTIONALIZED WITH PHOTOCHEMICAL GROUPS

This application is a continuation of application Ser. No. 08/084,891 filed Jun. 29, 1993 which is now abandoned.

BACKGROUND OF THE INVENTION

The invention relates to methods of interfacial polymerization and to novel products made possible by such methods, such as membranes.

Membranes are used, for instance, in separation processes as selective barriers that allow certain chemical species to pass, i.e., the permeate, while retaining other chemical species, i.e., the retentate. Membranes are used in many applications, for example as inorganic semiconductors, biosensors, heparinized surfaces, facilitated transport membranes utilizing crown ethers and other carriers, targeted drug delivery systems including membrane-bound antigens, catalystcontaining membranes, treated surfaces, sharpened resolution chromatographic packing materials, narrow band optical absorbers, and in various water treatments which involve removal of a solute or contaminant for example dialysis, electrolysis, microfiltration, ultrafiltration and reverse osmosis.

There is a myriad of supports or substrates for membranes. Specific physical and chemical characteristics to be considered when selecting a substrate include: porosity, surface area, permeability, solvent resistance, hydrophilicity, flexibility and mechanical integrity. Other characteristics may be important in certain applications.

As the use of porous membranes increases, so does the need to find new ways to modify, or functionalize, the membrane or membrane substrate. Without modification, effectiveness of the membrane is restricted by the nature of the membrane or membrane substrate material itself. Conversely, modification or functionalization of the surfaces of the membrane substrate can increase the usefulness of the substrate and can open up new areas of application.

There are already known methods of functionalizing the internal pore surfaces of a porous substrate. One method is radiation grafting which has the advantage that a wide variety of monomers can be used which permit further modification. Disadvantages with this method are that the radiation may degrade the substrate itself and the method requires expensive equipment. Another method of functionalizing is the coating method which has the advantage of being a simple procedure and is available for a variety of polymers. However, the coating method often results in blocking of the pores of the substrate and generally it is necessary to post crosslink in order to anchor the polymer to the substrate, otherwise the finished membrane may be unsuitable for use with some solvents as the solvents may remove the coating of the membrane from the membrane substrate. Another method involves the use of pre-functional resin to make the substrate which is then converted into some desirable end product substrate. This is a simple method but functionality is wasted throughout the bulk of the membrane. Further, post crosslinking may be needed if the membrane is to be used with solvents. Yet another method is oxidative derivatization which is simple but is limited in the choice of substrate. Further, the substrate may be degraded and there is insufficient control of the functionality.

There is no single method of functionalizing internal pore surfaces that is ideal for every situation. There is always a need for additional methods to modify, functionalize or form active surfaces for membrane applications.

Interfacial polymerization has been used to prepare thin film composite membranes. Interfacial polymerization is a process in which a very thin film can be made by reacting two, or more, monomers at an interface between two immiscible phases. It is best described by example. "Nylons" belong to a class of polymer referred to as polyamides. One such polyamide is made, for example, by reacting a diacid chloride, such as adipoyl chloride, with a diamine, such as hexamethylene diamine. That reaction can be carried out in a solution to produce the polymer in resin form. Alternatively, the reaction can be carried out at an interface by dissolving the diamine in water and floating a hexane solution of the diacid chloride on top of the water phase. The diamine reacts with the diacid chloride at the interface between these two immiscible solvents, forming a polyamide film at the interface which is rather impermeable to the reactants. Thus, once the film forms, the reaction slows down drastically, so that the film remains very thin. In fact, if the film is removed from the interface by mechanical means, fresh film forms almost instantly at the interface, because the reactants are so highly reactive with one another.

The discovery of interfacial polymerization in the late fifties provoked interest from the textile industry. Natural fiber textile manufacturers, particularly wool manufacturers, were looking for ways to make their textiles shrinkproof. In early experiments wool swatches were soaked in a diamine, excess diamine was squeezed out by passing the fabric through nip rollers, and the fabric was soaked in an acid chloride polymerizable with the diamine.

Numerous condensation reactions that can be used to make polymers interfacially have been described. Among the products of these condensation reactions are polyamides, polyureas, polyurethanes, polysulfonamides and polyesters. Factors affecting the making of continuous, thin interfacial films include temperature, the nature of the solvents and cosolvents, and the concentration and the reactivity of the monomers. Refinements which have been developed include the use of 'blocked' or protected monomers that can be later unblocked to alter the chemistry of the finished film or membrane, the use of post-treatment of the films to alter their chemistry, and the use of heteroatoms in the monomers to alter the properties of the final film or membrane. In the classical organic chemistry sense, these alterations or modifications can be referred to as changes in the functionality, i.e., in the available functional groups of the monomers and/or polymers, hence functionalization.

The use of interfacial polymerization to produce extremely thin film on a support is known. Such polymerization can be carried out by dissolving one monomer in a solvent and then using that solution to saturate the substrate. The outer surface of the substrate, saturated with the first solution, is then exposed to a second solution, immiscible with the first solution, containing a second monomer. A very thin film of polymer is formed at the interface of these two solutions on the outside surface of the substrate.

In the above process the substrate serves as a mechanical support for the thin film formed by interfacial polymerization. The thin film itself extends across and blocks any pores present in the substrate. Thus, this use of interfacial polymerization does not take advantage of the great surface area available within a porous substrate.

SUMMARY OF THE INVENTION

According to one aspect of the present invention there is provided a method of preparing a porous article, which method comprises:

contacting a porous substrate with a first reactant that enters pores of the substrate; and contacting the porous substrate bearing the first reactant with a second reactant that is capable of reacting with the first reactant in an interfacial polymerization reaction;

the amounts of first and second reactant being selected such that there occurs nor or substantially no, closing of pores of the substrate.

According to another aspect of the present invention there is provided a porous article bearing a compound which is photochemically reactive and capable of undergoing a substantially non-reversible chemical transformation upon exposure to ultra-violet, visible or near infra-red irradiation.

According to a further aspect of the present invention there is provided a method of functionalizing a substrate which comprises contacting the substrate with, or forming thereon, a polymer which is photochemically reactive and capable of undergoing a substantially non-reversible chemical transformation upon exposure to ultra-violet, visible or near infrared irradiation.

According to a further aspect of the present invention, there is provided a derivatized porous article and a product of a photochemically reactive moiety on surfaces of said porous substrate.

According to another aspect of the present invention there is provided a method of derivatizing a porous substrate which comprises irradiating an article bearing a compound which is photochemically reactive as defined above wherein the irradiation is at a wavelength within the range from ultraviolet to near infra-red.

According to a further aspect of the present invention there is provided a method of separation comprising passing a fluid comprising a compound to be separated through a porous article bearing a compound which is photochemically derivatized as defined above.

According to another aspect of the present invention there is provided a method of conducting a chemical reaction which comprises passing a fluid through a derivatized porous article as defined above wherein the fluid comprises a compound to be reacted and the article comprises a catalyst for the reaction of the compound to be reacted.

DETAILED DESCRIPTION OF THE INVENTION

The substrate can take many forms. Examples include fibers, hollow fibers, films, beads, woven and non-woven webs, spun threads and microcapsules. Suitable substrates may be polymeric, ceramic, cellulosic (such as paper), glassy, metallic or carbonaceous. For instance a suitable substrate may be a monolithic substance that is penetrated by pores. Such a monolithic substrate may be formed, for example, by extraction of phase-separated polymers, by extraction of soluble particles from a polymeric matrix or by sintering fine particles of a suitable material.

Alternatively, the substrate may be formed from fibers, for instance in woven form or in non-woven felted form. Woven and non-woven webs may have either regular or irregular physical configurations and provide large surface areas. Non-woven fibrous webs are easy to manufacture, inexpensive and allow for variation in fiber density and texture. A wide variety of fiber diameters, e.g., 0.05 to 50 microns, can be used. Web thickness can vary widely to fit the application, e.g., 1 micron to 1000 microns or more.

Major surfaces of a substrate may be planar or curved, whereas complex surfaces may be tentacular, jagged, uneven, undulating, irregular or asymmetrical. For example, a porous planar object or porous bead appears to have outer surfaces which are planar or spherical, respectively, as their major surfaces. But on a microscopic scale, the porous planar object or porous bead has a complex three dimensional geometric configuration. In another example, a nonwoven web or matrix may appear to be flat and to have a planar major configuration. But on a microscopic scale, the surfaces of the web are an unpatterned layering of strands which give the nonwoven web a complex geometric configuration. The pores of the web, membrane or bead are uneven, irregular, and unpatterned in all three dimensions.

The pores of the porous substrate are the spaces, voids or interstices, provided by the microscopic complex three-dimensional configuration, that provide channels, paths or passages through which a fluid can flow.

The polymer formed by the interfacial polymerization of the present invention is located on such surfaces defining such pores but does not cover, block, clog or fill such pores to any substantial extent.

The effective sizes of pores may be at least several times the mean free path of flowing molecules or particles. A wide range of pore sizes can be accommodated, e.g., from about one nanometer to about several hundred microns.

For macrofiltration, effective pore sizes of the substrate may range from about 2 to about 200 microns, more preferably 2 to about 50 microns.

For microfiltration, the pore diameters of the porous substrate can vary widely but preferably range from 0.01 to 2.0 microns, more preferably from 0.1 to 1.0 microns and particularly from 0.2 to 1.0 microns. Pore diameters for microfilters are measured by the bubble-point method according to ASTM F-316.

The porosity or pore volume of a polymeric porous substrate is preferably from 30 to 95%, more preferably from 45 to 85% and particularly from 60 to 80%. Porosity can be derived from the value of the bulk density of the porous substrate and the polymer density of substrate polymer according to ASTM D-792.

The thickness of substrate will depend on the intended use of the membrane product. For many uses, for example microfiltration, thicknesses ranging from 1 to 1000 microns, more preferably 10 to 240 microns and particularly 20 to 100 microns, would be suitable.

Pore size will also affect the use for which the membrane is suitable. The pore size distribution through the substrate cross-section may be symmetric or asymmetric. Asymmetric membranes typically have a higher permeability than symmetrical membranes having similar particle retention characteristics.

The porous substrate may have either a reticulated or a granular structure. A reticulated structure generally has a higher porosity than a granular one. A reticulated substrate has a network of open interstitial flow channels around fibrous strands. A granular structure is a porous network formed around coalesced solid particles.

Although we do not wish to be bound by this hypothesis, our hypothesis is that the method of the present invention enables positioning of a polymer on the internal pore surfaces of a porous substrate so that the porous substrate bearing the polymer can function as a membrane for filtration or other purposes. The pores remain substantially free, i.e., unblocked and unclogged by the deposited polymer. Thus the polymer deposited on the inner pore surfaces of the substrate is free to assist filtration of a feed stream, or to interact with species in a feed stream, as the feed stream passes through or past the membrane.

A substantial portion, preferably all, of the surface pores of a substrate/membrane formed by the method of the invention remain open. Ideally, no continuous film or layer is formed over major outer surfaces of the substrate so that the pores of the substrate are not blocked.

One aspect of the invention is directed to membranes composed of porous substrates bearing compounds which are photochemically reactive. This aspect includes thin-film composite membranes in which a polymer, for example, comprising the photochemically reactive group is present in a layer on the surface of a substrate. In this aspect, it is not always essential that the deposited polymer does not block pores of the substrate. The invention does extend, of course, to membranes in which a polymer comprising a photochemically reactive group is located on the inner pore surfaces of the membrane and the pores are not blocked.

The amount of polymeric coating on the substrate can be measured by the mass gain, i.e., the increase in weight caused by the presence of the polymer on the substrate, expressed as a percentage of the weight of the polymer-free substrate. It is found that, in general, for a material having a density of 1 gm/cc, a mass gain of about 5% or more will provide sufficient polymer to affect the properties of the substrate. It is not usually necessary, for a material having a density of 1 gm/cc, that the mass gain exceed about 50%. As the mass gain increases there is an increasing risk of closing of pores of the microporous substrate, which is undesirable. Usually it is preferred, for a material having a density of 1 gm/cc, that the mass gain is in the range of about 10 to 50%, more preferably 12 to 17%, but this may vary depending upon the intended application of the membrane, the internal surface area and the porosity of the substrate.

The choice of substrate will depend at least partly on the use. Depending on the use, the substrate may be continuous or non-continuous, flexible or rigid. An example of a non-continuous and rigid substrate is a microporous chromatography bead. As an example of a continuous and flexible substrate there may be mentioned a microporous polyolefin microfiltration membrane or paper. Substrates intended for use with photochemically reactive groups should be sufficiently transparent at the wavelength at which they are to be irradiated, i.e., the wavelength at which photochemical transformation of the photochemically reactive groups is to occur, that the photochemical reaction can be carried out. For example, polyethylene or polypropylene is sufficiently transparent at a wavelength of about 350 nm at which photochemical reaction of a diazoketone group occurs for them to be suitable as a substrate for the diazoketone group. Non-limiting examples of polymeric materials suitable as substrate are: polyolefins, such as polyethylene and polypropylene; polyhalo-olefins; polyurethanes; polycarbonates; polysulfones; polyethersulfones; polyamides, such as nylons; polyamides; polyetherimides; and polydialkenylphenylene oxides.

Interfacial polymerization may be used to form a variety of polymers, for example: polyamides, polyureas, polyurethanes, polysulfonamides, and polyesters, as determined by the monomers or reactants used, i.e., the first and second reactants. Since the first and second reactants are usually monomers, they will sometimes be referred to hereinafter as monomers but it should be understood that in some instances the first or second reactants may be di-, tri- or oligomeric, rather than monomeric. Also, the first reactant may be a mixture of two or more reactants and, likewise, the second reactant may be a mixture of two or more reactants.

When the first reactant is in solution the concentration can vary widely. For example, immediately before contact with the second reactant, the concentration of the first reactant may be as low as 5% (w/v) or as high as 100% (w/v). Similarly the concentration of the second reactant can range from 5% to 100% (w/v). Specific concentrations used can be adjusted depending on the desired quantity of polymer to be formed.

Polyamides are formed by having a di- or multiacid (preferably in the form of its acid halide) in one phase and a di-or multi-amine in the other phase. Similarly, polyureas are formed from di- or multiisocyanates and di- or multi-amines; polyurethanes from di- or multi-isocyanates and di- or multi-ols; polyesters from di- or multi-acids (preferably in the form of their acid halides) and di- or multi-ols; and polysulfonamides from di- or multi-sulfonic acids (preferably in the form of sulfonyl halides) and di- or multi-amines. These and other suitable reactants for interfacial polymerization are known and the present invention will be illustrated by discussion of polysulfonamides formed from di- or multi-amines and di-or multi-sulfonyl chloride as examples of such reactants.

The presence of multi-amine or multi-sulfonyl chloride will result in crosslinking. Thus, where crosslinking is desirable and when a diamine is referred to, it is to be understood that a di-and/or a multi-amine may be used. Similarly, when a disulfonyl chloride is referred to, it is to be understood that a di- and/or multi-sulfonyl chloride may be used.

As suitable diamines there are mentioned di-terminal diamines containing from 2 to 12 carbon atoms in a chain, for example ethylene diamine, 1,8-octanediamine,1,12-dodecanediamine and the like. The carbon chain can be straight or branched and can contain other functional groups, provided that those functional groups do not interfere with the required polymerization reaction. As examples of such other functional groups which do not interfere with the polymerization there may be mentioned ethers, ketones and esters. After polymerization, the functional groups may be used to attach other species to the formed polymer. For example, a tertiary amine can be converted to a quaternary ammonium salt by reaction with an alkyl halide. If necessary, functional groups can be protected during the polymerization reaction and the protective group subsequently removed. For example, a carboxylic acid can be protected in the form of one of its esters by reaction with the appropriate alcohol and, conversely, an alcohol can be protected in the form of an ester by reaction with a carboxylic acid. Examples of diamines containing additional functional groups include secondary amine-group-containing compounds such as diethylene triamine, triethylene tetramine and the like. It is of course possible to use mixtures of amines.

Sulfonyl halides, rather than sulfonic acids, are preferred for reaction with the diamines. Although free acids and derivatives such as anhydrides and esters can also form amides with amines, in practice their reaction time in interfacial polymerization reactions is usually too slow for them to be useful. Again, the disulfonyl halides can contain additional functional groups provided that they do not interfere with the polymerization reaction, or provided that the functional groups are present in protected form during the polymerization reaction. Examples of suitable dior trisulfonyl halides include:

3-diazo-4-oxo-3,4-dihydro-1,6-naphthalene disulfonyl chloride (DKDSC)

1,3,6-naphthalene trisulfonyl chloride (NTSC)
1,5-naphthalene disulfonyl chloride (NDSC).

When a tribasic acid, such as NTSC, is used, the polymer formed will include some crosslinks. Multi-amines, such as triamines or tetramines, will also form crosslinks. It is of course possible to use mixtures of acids or, as mentioned above, mixtures of amines.

A ketene, formed by photolysis of a diazoketone, can undergo subsequent addition to a nucleophile. For example, when the nucleophile is an amine, a thiol, an alcohol or water, the addition yields an amide, a thioester, an ester or a carboxylic acid respectively. Such nucleophilic addition is illustrated by 2-diazonaphthalenone and its derivatives:

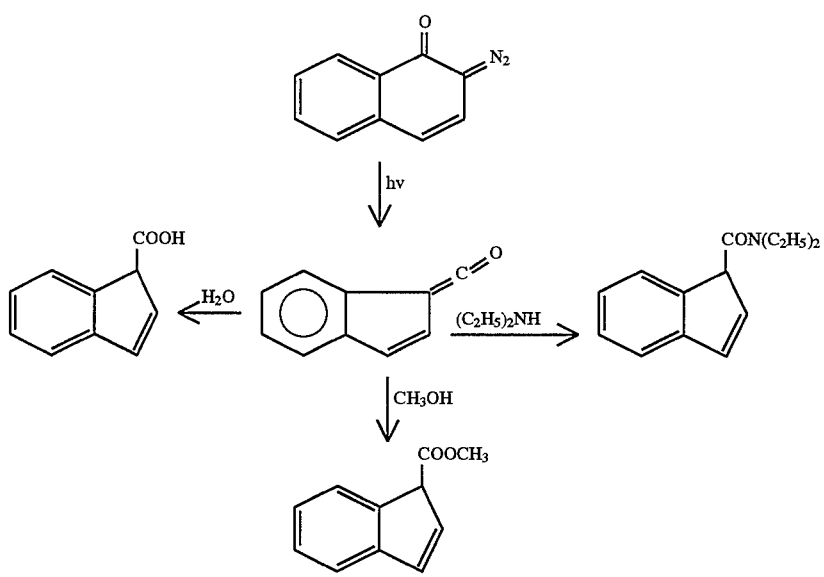

When using an amine and a sulfonyl chloride to form a polysulfonamide it is preferred that the first reactant is the amine or a solution of the amine and the second reactant is the sulfonyl chloride or a solution of the sulfonyl chloride.

Suitable solvents for the amine include water or polar, preferably highly polar, organic solvents.

Suitable solvents for the sulfonyl chloride include non-polar solvents such as hydrocarbons or halogenated hydrocarbons, for example, carbon tetrachloride. The choice of solvent is limited only by its ability to dissolve the monomers and to form a sharp phase boundary. A mixture of solvents can be used. If a mixture is used, one of the solvents may be present, for example, to enhance polymer deposition e.g. chloroform can enhance deposition of polysulfonamide.

Solvents completely or relatively inert toward the particular porous substrate are naturally preferred.

It is possible to apply some reactants, for example volatile acid halides, in the vapor phase, without solvent.

The reactants can be selected so that the formed polymer contains functional groups. Examples of such groups include chemically reactive groups, e.g. amino, hydroxy, carboxy and the like; and those that impart hydrophilicity, e.g. a polyethylene glycol; hydrophobicity, e.g. a long chain alcohol such as dodecyl alcohol; oleophobicity, e.g. perfluorododecyl alcohol; ionic character, e.g. a quaternary ammonium salt, or a carboxylate or sulfonate; catalytic activity, e.g. an enzyme; and photoreactivity, e.g. a diazoketone.

Of importance, are compounds containing photochemically reactive groups. Such photochemically reactive functional groups may conveniently be illustrated by the types of reaction they undergo. These reactions include: (a) photochemical fragmentation; (b) photochemically induced isomerization; (c) photochemical generation of acidic species; and (d) photochromic reactions. Photochemical fragmentation reactions yield chemical intermediates such as ketenes or free radicals.

Free radicals may be formed by alpha-cleavage of an aldehyde or ketone or by photofragmentation of a peroxide or azo compound. These free radicals can, for example, initiate polymerization of a vinyl monomer. An example of a compound that will undergo free radical photochemical fragmentation is 2-hydroxy-2-phenylacetophenone (benzoin):

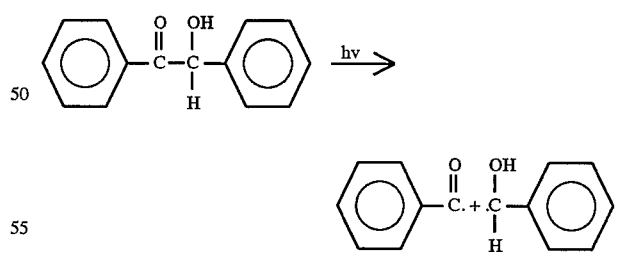

Photochemically induced isomerization leads to a conformational change, for example in a polymer chain. Such a conformational change may be a change in geometric structure, a change in dipole moment, or the generation of a charge. Photochemically induced isomerizations include: cis-trans isomerization; ring-formation or ring cleavage; ionic dissociation; and hydrogen transfer tautomerism. An example of cis-trans isomerization is the photolysis of azobenzene:

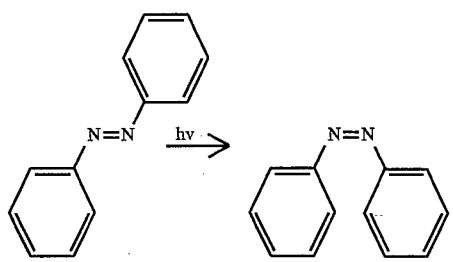

Ring-formation or ring-cleavage is illustrated with 1,3-diene-4-methyl-1-(2,4,6-trimethylphenyl)-2,3-pentanedioic acid anhydride:

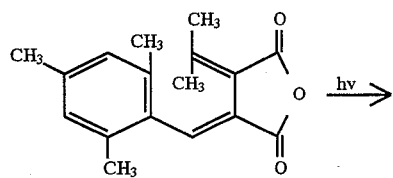

-continued

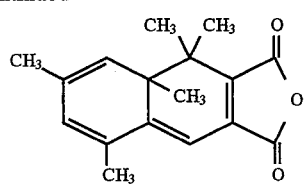

Ionic dissociation is illustrated with Malachite Green leucocyanide:

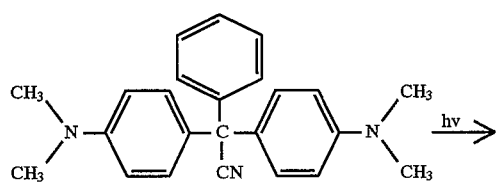

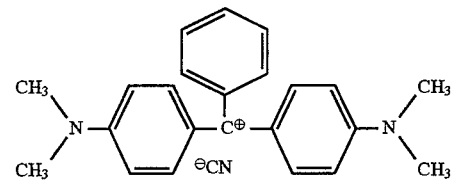

Hydrogen transfer tautomerism is illustrated with: 1,4-dihydroxyanthraquinone:

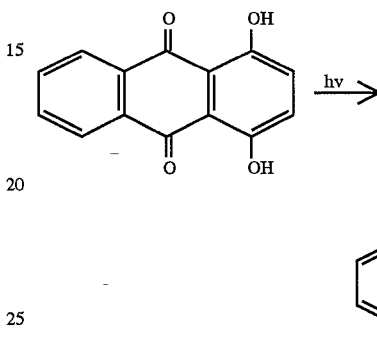

and with the 2-(4-nitrobenzyl) benzoate ion:

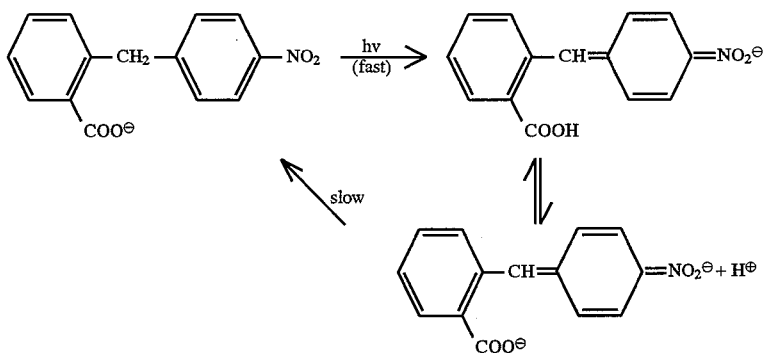

Photochemical generation of acidic species such as UV-deblockable acid-releasing systems is illustrated with 2,2-dimethyl-2-(((4-methylphenyl)sulfonyl)oxy)-1-phenyl-1-ethanone:

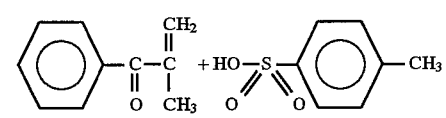

An example of a photochromic system is 1'3'-dihydro-1', 3',3'-trimethyl-6-nitrospiro[2H-1-benzopyran-2.2(2H) indole]:

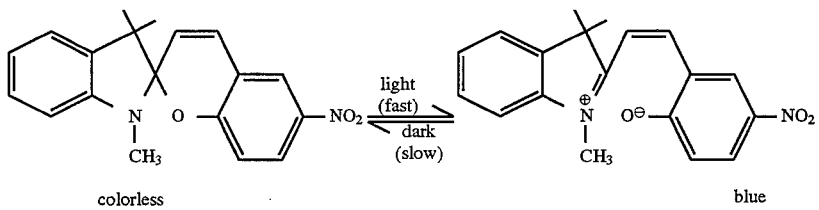

colorless            blue

All the above groups are contemplated as functional groups in the first or second reactant and thus can form part of the polymer formed on the porous substrate. Naturally, the intermediates and other species formed by the above photochemical reactions can undergo further non-photochemical reaction to yield a wide variety of compounds.

Photochemically reactive groups are transformed to their photochemical products by irradiation at wavelengths between ultra-violet and near infra-red. The reactions are irreversible in the sense that the products of reaction do not readily revert to their starting structure when irradiation ceases. The products are transformed to relatively stable products of different configuration or composition, or they are transformed to unstable intermediates which spontaneously decompose or react with reactive compounds in their environment.

In the choice of a photochemically reactive group, the following are desirable features: photochemistry which permits introduction of a range of functional groups from a single precursor; a photochemical reaction which proceeds efficiently to give a single product; absorption of light at wavelengths which avoid light-induced deterioration of the substrate; and absorption of visible light to minimize the cost of the irradiation source.

Functionalization of a membrane by means of photochemically reactive groups is an effective method to improve membrane performance, as it permits a variety of functional groups to be introduced into or onto the surfaces of the membrane. The photochemically reactive group can be converted to other groups of useful chemical functionality. For example, as mentioned above, a photochemically reactive diazoketone group can be converted to: an ester by irradiation when in contact with an alcohol; an amide by irradiation when in contact with an amine; and a carboxylic acid by irradiation when in contact with water. These groups can be further converted. For example, if the diazoketone is irradiated in contact with a tertiary amine having a terminal hydroxy group, the resulting ester has the tertiary amine group, which can be quaternized to form a positively charged, quaternary ammonium, ionic species. Photochemically reactive groups thus offer the possibility of conversion to compounds having a specific ionic charge or specific ionic species. This is useful since some separations of charged particles are enhanced by the presence of ionic species in a membrane.

The conversion of photochemically reactive groups to a variety of chemically useful functional groups offers the possibility of an "off-the-shelf" membrane which can be modified by the purchaser or user for a variety of different chemical applications. In the case of a biotechnological separation, the membrane can be used to attach a ligand to enhance selective separation of a product. If the ligand involved is a proprietary ligand, such "off-the-shelf" membrane versatility allows the membrane user to adapt the membrane for use with a specific enzyme, without risking revealing proprietary information to an outside source, such as the membrane manufacturer.

In a preferred embodiment, a porous substrate having pores formed by fibrils and a photochemically reactive compound which forms a substantially continuous coating encapsulating the fibrils. Such a substantially continuous coating is formed when the polymer exists on the pore surfaces of the substrate as a connected network. The coating is thus linked to itself about and around structural elements defining the pores of the substrate.

With regard to the method, the substrate is first contacted with the first reactant or monomer, which is conveniently dissolved in a solvent. It is a feature of the invention that pores in the porous substrate remain open. Hence, the amounts of reactant used to form the polymer in situ must not be so large that there is formed a continuous film of polymer over major surfaces of substrate; the polymer is formed on the inner surfaces of the pores which remain open after removal of solvent. To ensure that a continuous film does not form over major surfaces, it is necessary to control the amounts of the fluids or solutions containing the reactants used to form the polymer. This can be done, for example, by limiting the amount of the first reactant that is applied to the porous substrate. Alternatively, excess first reactant can be applied to the porous substrate and some of the first reactant, or some of the solvent for the first reactant, then removed, for instance in a drying step, before the second reactant is fed to the substrate, to reduce the volume of the first reactant or first reactant solution to less than that of the pore volume. Conveniently, an excess can be applied by soaking the substrate in a solution of the first reactant, which may be, for example, an aqueous solution of the amine.

Evaporation is the preferred way of removing excess fluid or solvent. With small pore sizes, mechanically squeezing out excess would be inadequate since capillary forces would tend to recapture liquid squeezed out of the pores. Mechanically squeezing may also damage some substrates, and is impossible with rigid substrates.

The rate of reaction between, for example, a diamine and a disulfonyl chloride is diffusion controlled, and does not normally go to 100% completion. Furthermore, the reaction between a diamine and a disulfonyl chloride will lead to release of hydrogen chloride. Hydrogen chloride will react with amine groups, creating an acid addition salt and interfering with reaction between amine groups and acid chloride groups. In some instances a basic compound, for example pyridine or other non-nucleophilic base, is added as a scavenger for hydrogen chloride. By routine experimentation it is possible to determine how much diamine to load, and subsequently how long to immerse the diamine-loaded substrate in sulfonyl chloride solution of a particular concentration to obtain a specified mass gain.

Surface active agents can be added to enhance wetting of the substrate. Other possible additives include acid acceptors or scavengers such as bases as are well-known in the art. These are commonly added to the aqueous solution in polyamide-forming interfacial reactions. Among the commonly used acid acceptors are sodium phosphate, sodium hydroxide, and N,N-dimethylpiperazine, with or without the addition of surface active agents such as dodecyl sodium sulfate. Alternatively, an excess of the diamine can be used to scavenge the acid by-product.

The strength of attachment can be increased with crosslinking by way of some tri-functional monomer in place of difunctional monomer. Thus the polymer, once formed, is not readily removed and the membrane product can be used with solvents.

One preferred method for applying a coating to a substrate by interfacial polymerization is to apply the second reactant to a substantially solvent-free first reactant. This method can be called the "dry method". In the dry method, a diamine, for example, is dissolved in a suitable volatile solvent, for example, methanol. The methanolic solution of diamine is applied to the substrate. The methanol is then removed by evaporation. This can be achieved by evaporating the methanol at room temperature, or the substrate bearing the methanolic solution can be subjected to reduced pressure, or it can be heated to speed the evaporation. Of course, if heat is used it should be sufficiently mild that it does not adversely affect properties of the substrate which, in some cases, may be heat sensitive.

When the methanol has been removed there is left on the substrate the diamine. The diamine-bearing substrate is then immersed in a solution of the second reactant, for example, a disulfonyl chloride. When the diamine and the disulfonyl chloride encounter each other they react to form, initially, an oligomer that forms an interface. Further reaction is believed to occur as diamine diffuses through the interface, forming polymer on the substrate. Normally, in the method of the present invention, interfacial polymerization would occur, and polymer would be located, throughout the substrate. The polymer is believed not to be chemically bound to the substrate, but it does surround or enclose regions of the complex surface of the substrate, especially in those cases where the amine or the sulfonyl chloride or both, are more than difunctional, so that crosslinking occurs. For the purpose of the present invention, permanent attachment would be indicated by the inability of aqueous systems or solvents to remove the formed polymer.

The substrate may be wetted before contact with the first reactant solution, conveniently with a solvent which is miscible with the solvent to be used for the first reactant, to assist uptake of the reactant by the substrate. For example, in the method using an aqueous solution of diamine, as first reactant, with a hydrophobic porous substrate, the substrate can be wetted with methanol before contact with the diamine solution. Another way to assist reactant uptake by the substrate is to use reduced pressure. For example, if the substrate is planar, the reactant solution is applied to one side of the planar substrate and the pressure is reduced on the other side, to draw the reactant solution into the substrate.

If the diamine has a short chain, it may have high surface energy and consequently, may form a ball or bead on the internal pore surfaces, rather than spread evenly when deposited on the substrate. When reacting with sulfonyl chloride, there may be formed a polymer film enclosing unreacted amine which is later washed out. The resulting polymer film, in this case, may be a quite rough and irregular coating. This is advantageous when high surface area or tortuosity in the resulting substrate is desired. For example, when a reactive functionality is incorporated into the coating. When desired, to avoid this rough coating, a wetting agent or a surfactant can be incorporated in the solution of diamine to reduce the surface energy of the diamine and cause it to spread. Longer chain diamines have lower surface energy and will therefore spread naturally, not requiring the assistance of a wetting agent.

EXAMPLES

In the examples, unless stated otherwise, all rinses with solvent were for 3 minutes with a 50 mL portion of solvent for each rinse. The porous substrate was a polypropylene suitable for microfiltration and having the following characteristics: a pore size of 1.10 microns; a porosity or void volume of 82.9%; and a thickness of 83.9 microns. Mass gain was calculated as the difference in weight between the dry untreated substrate and the dry treated, or polymer-bearing, substrate. The composition of the polymer-bearing substrate was verified using transmission Fourier transform infra-red spectroscopy with the substrate compressed at a pressure of 138 MPa (20,000 psig). Where appropriate, the spectra were compared with spectra of the untreated substrate. The presence of sulfur and chlorine in the polymer-bearing substrates was verified by energy dispersive X-ray analysis. Blockage of the pores was checked with scanning electron microscopy.

Care was taken to avoid contact with light of any monomer or polymer containing the photochemically reactive 3-diazo-4-oxo-moiety.

Example 1

A 7.6 cm (3 inch) diameter disk was cut from the polypropylene substrate. The disk was rinsed three times with acetone. After drying at room temperature, the disk was weighed.

The disk was rinsed with methanol for five minutes to wet it. After rinsing, the disk was left for thirty minutes in 50 mL of a 10 g/L 1,6-hexanediamine solution in water. The disk was removed from the diamine solution and its surface was patted to dry the surface of the disk. The disk was weighed to determine the diamine solution uptake.

The disk was left at room temperature, allowing water to evaporate. Evaporation was allowed to proceed until 90% by weight of the water had evaporated, based on the total weight of diamine solution taken up by the disk. The disk was then immersed for sixty minutes at room temperature in 100 mLs of a solution of sulphonylchlorides dissolved in carbon tetrachloride. The solution contained 2.5 g/L of a mixture of 3-diazo-4-oxo-3,4-dihydro-1,6-naphthalene disulfonylchloride (DKDSC) and, to provide cross-linking, 1,3,6-naphthalene trisulphonyl-chloride in a weight ratio of 95:5. Polysulfonamide was formed at the aqueous diamine interface.

The polymer-bearing disk was then rinsed twice with chloroform and then twice with absolute ethanol to remove residual unreacted monomer.

The disk was dried at room temperature and weighed.

The mass gain was 15.2%. This gain was attributed solely to polysulfonamide having photochemically reactive groups. Analysis showed the presence of diazo and sulfonamide groups, indicating diazo-containing polymer, and an absence of chlorine groups, indicating absence of unreacted sulfonylchloride monomer.

Polysulfonamide was found to be distributed throughout the internal surfaces of the substrate. The pores were essentially unblocked. Thus the substrate essentially retained its complex geometric configuration.

Example 2

A disk prepared according to Example 1 was irradiated at 350 nm for thirty minutes (15 minutes per side) while immersed in 20 mL of absolute ethanol to convert the 3-diazo-4-oxo-moiety first to an intermediate ketene and then, by reaction with the ethanol, to the corresponding ethyl ester.

The disk was dried at room temperature and weighed.

The mass gain was 5.4%. Analysis showed the presence of carbonyl and sulfonamide groups but showed no diazo groups. This indicated that the mass gain is attributable to the polymer resulting from the chemical transformation of the photochemically reactive polysulfonamide to the corresponding ethyl ester.

Polysulfonamide ethyl ester was found to be distributed throughout the pores of the substrate. The pores were essentially unblocked.

Example 3

A disk of 8.5 cm. (3.4 inch) diameter was cut from the polypropylene substrate. The disk was rinsed in acetone, dried and weighed as in Example 1. The disk was immersed for 30 minutes in 50 mL of a 20 g/L solution of 1,8-octanediamine in methanol. The disk was then removed and left to stand for 30 minutes to evaporate essentially all the methanol and reopen the pores.

The disk was immersed for 2 hours at 50° C. in a solution of sulfonylchlorides. The solution contained 10 g/L of a mixture of 3-diazo-4-oxo-3,4-dihydro-1,6-naphthalene disulfonyl-chloride and, to provide cross-linking, 1,3,6-naphthalene trisulfonylchloride in a weight ratio of 95:5. The solvent was a binary mixture of 40% (v/v) chloroform in carbon tetrachloride. The purpose of the chloroform was to enhance deposition of polymer. Polysulfonamide was formed at the interface between the diamine located on the internal surfaces of the substrate and the sulfonylchloride solution.

The polymer-bearing disk was rinsed twice each with chloroform, methanol and deionized water to remove monomer, oligomer and any removable polymer.

The disk was dried and weighed.

The mass gain was 31.4%. This gain was attributed solely to polysulfonamide having photochemically reactive groups. Analysis showed the presence of diazo and sulfonamide groups, indicating diazo-containing polymer, and an absence of chlorine groups, indicating absence of unreacted sulfonylchloride monomer.

Polysulfonamide was found to be distributed throughout the pores of the substrate. The pores were essentially unblocked. The void volume was found to be 75.6%.

Example 4

A disk was prepared according to Example 3. After polymer formation, rinsing and drying, the disk was immersed in 20 mL of de-ionized water and irradiated at 350 nm for 30 minutes (15 minutes each side). The irradiation in water converted the 3-diazo-4-oxo-moieties to carboxylic acid groups by way of the ketene intermediate.

The mass gain was 17.1%. Analysis showed the presence of carbonyl and sulfonamide groups but showed no diazo or chlorine groups. This indicated that the mass gain is attributable to the polymer resulting from the chemical transformation of the intermediate ketene groups of the photochemically reactive polysulfonamide to the corresponding carboxylic acid.

Polysulfonamide was found to be distributed throughout the pores of the substrate. The pores were essentially unblocked. The void volume was found to be 77.8%.

Example 5

A disk was prepared according to Example 3 except that 1,5-naphthalene disulfonylchloride was used instead of the 3-diazo-4-oxo-3,4-dihydro-1,6-naphthalene disulfonylchloride. The polysulfonamide-bearing substrate thus had no photochemically reactive groups.

After drying and weighing, the mass gain was found to be 17.0%.

Polysulfonamide was found to be distributed throughout the pores of the substrate. The pores were essentially unblocked. The void volume was found to be 78.4%.

Example 6

Particle challenge tests were used to determine the effect of substrate treatment on the filtration properties of the porous substrate by comparing a disk of untreated substrate with disks prepared according to Examples 3, 4 and 5. The tests were conducted in a dead end stirred cell at a pressure of 13.8 kPa (2 psig) and a stirring speed of 450 rpm. The particles used for the test were spheres of polystyrene and of carboxylate modified polystyrene (obtained from Seradyn Inc., Indianapolis, Ind.). Samples of spheres had well-defined diameters. Particular diameters evaluated were in the range of 200 to 500 nm. The particles were dispersed at a concentration of 100 ppm in a buffer solution of pH 9. The aqueous buffer solution contained: 1.6 g/L ammonium chloride; 2.0 mL/L ammonium hydroxide (30% aqueous) and 0.05% (m/v) TRITON X-100. Scanning electron microscopy was used to examine the presence of spheres in the pores of the substrate.

Scanning electron microscopy revealed considerable fouling of the untreated control substrate. The substrates prepared according to Examples 3, 4 and 5 showed substantially no fouling. The fouling was least when using carboxylate modified polystyrene spheres with the substrate of Example 4. The absence of fouling was believed to be the result of the repulsion of the negatively charged spheres by the negatively charged acid groups of the polysulfonamide. These results show that functionalizing a substrate can significantly alter the properties of the substrate.

Examples 7–11

The following examples, although using only model compounds, illustrate the products formed on photolysis of photochemically reactive groups in contact with various nucleophiles. These examples use the reactive ketene intermediate formed by photolysis of a diazoketone.

Example 7

A photochemical compound, 5-diazo-5,6-dihydro-6-oxo-1-naphthalene-N,N-diethylsulfonamide (I) (0.2 g) and 3-diazo-3,4-dihydro-4-oxo-1-naphthalene-N,N-diethylsulfonazmide (II) (0.2 g)

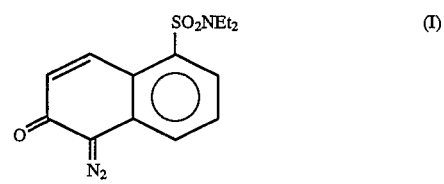

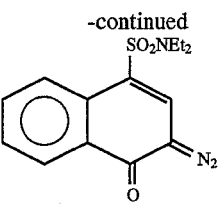

(II)

were separately photochemically irradiated at 350 nm for 2 hours in 120 mL of diethyl ether saturated with water. The solvent was removed under vacuum. The photochemical products were, as expected, the corresponding indene-carboxylic acids. The products were purified from chloroform and n-hexane. The product compounds were verified and characterized using infra-red, $^{13}C$ and $^1H$ NMR, and mass spectral analyses.

Example 8

A photochemical compound, 5-diazo-5,6-dihydro-6-oxo-1-naphthalene-N,N-diethylsulfonamide (0.2 g) was photochemically irradiated at 350 nm for 2 hours in a solution of 2-bromoethanol (1 ml; 14 mmol) and 100 mL of diethyl ether. The solution was washed with 4×50 mL of water and dried over anhydrous sodium sulfate. The ether was removed in vacuum. The photochemical product was, as expected, the corresponding bromo-ethyl ester of the indene-carboxylic acid. The product was verified and characterized using infra-red, $^{13}C$ and $^1H$ NMR, and mass spectral analyses.

Example 9

A photochemical compound, 5-diazo-5,6-dihydro-6-oxo-1-naphthalene-N,N-diethylsulfonamide (0.1 g) was photochemically irradiated at 350 nm for 2 hours in a solution of ethylene glycol (15 mL; 0.27 mol) and 85 mL of diethyl ether. The solution was washed with 3×100 mL of water and dried over anhydrous sodium sulfate. The ether was removed in vacuum. The photochemical product was, as expected, the corresponding hydroxyethyl ester of the indene-carboxylic acid. The product was verified and characterized using infrared, $^{13}C$ and 1H NMR, and mass spectral analyses.

Example 10

A photochemical compound, 5-diazo-5,6-dihydro-6-oxo-1-naphthalene-N,N-diethylsulfonamide (0.1 g) was photochemically irradiated at 350 nm for 45 min. in a solution of diethyl-amine (0.1 mL; 0.97 mmol), glacial acetic acid (1 mL; 17.5 mmol), and 100 mL of methylene chloride. The solution was washed with 3×100 mL of water and dried over anhydrous magnesium sulfate. The ether was removed in vacuum. The photochemical product was, as expected, the corresponding N,N-diethyl amide of the indene-carboxylic acid. The product was verified and characterized using infra-red, $^{13}C$ and $^1H$ NMR, and mass spectral analyses.

Example 11

A photochemical compound, 5-diazo-5,6-dihydro-6-oxo-1-naphthalene-N,N-diethylsulfonamide (0.1 g) was photochemically irradiated at 350 nm for 1.5 hours in a solution of methyl piperazine (0.1 g), glacial acetic acid (2 mL), and 100 mL of diethyl ether. The solution was washed with water (3×50 mL, acidic, basic, and neutral) and dried over anhydrous sodium sulfate. The volume of ether was reduced to 10 mL and impurities removed by filtration. The ether was removed in vacuum. The photochemical product was, as expected, the corresponding N'-methyl piperazine amide of the indene-carboxylic acid. The product was verified and characterized using infra-red, $^{13}C$ and $^1H$ NHR, and mass spectral analyses.

Examples 12–27

The effect of the polymer, formed by interfacial polymerization, on the porosity of the porous substrate was investigated. The procedure of Example 3 was followed for a number of control samples using two different concentrations of octanediamine in the amine solution and varying proportions of di- and tri-sulfonyl chloride. The concentration of diamine is reflected by the mass gain of the final polymer-bearing disk; at the higher concentration of diamine, more diamine is available for polymerization with the sulfonyl chloride solution and thus, more polymer can be formed. The mass gain and the porosity were determined. In the above range of mass gains, the decrease in porosity of the porous substrate showed surprisingly little dependence on the mass gain. That is, a larger mass gain (more polymer) did not significantly decrease porosity (more blocked pores). For most samples the porosity was not reduced more than about 11% and for some samples, not more than about 8%. The results are shown in the following table:

| | MASS GAIN VS. POROSITY | | | | |
|---|---|---|---|---|---|
| Ex. | [1,8-Octane-diamine] | (NDSC + NTSC] (g/L) | % NTSC (g/L) | MASS GAIN | POROS-ITY % |
| Untreated | | | | 0.0 | 82.9 |
| 12 | 20 | 10 | 10 | 13.9 | 80.2 |
| 13 | 20 | 20 | 5 | 14.0 | 79.7 |
| 14 | 20 | 10 | 10 | 15.2 | 74.0 |
| 15 | 20 | 10 | 5 | 16.2 | 78.8 |
| 16 | 20 | 10 | 5 | 17.0 | 77.1 |
| 17 | 20 | 20 | 10 | 17.4 | 78.4 |
| 18 | 20 | 20 | 5 | 17.6 | 73.7 |
| 10 | 20 | 20 | 10 | 17.9 | 82.9 |
| 20 | 40 | 20 | 10 | 22.3 | 77.7 |
| 21 | 40 | 20 | 10 | 26.4 | 77.9 |
| 22 | 40 | 10 | 5 | 35.8 | 78.0 |
| 23 | 40 | 10 | 10 | 36.0 | 74.6 |
| 24 | 40 | 20 | 5 | 38.0 | 76.7 |
| 25 | 40 | 10 | 5 | 38.7 | 75.5 |
| 26 | 40 | 20 | 5 | 38.9 | 74.9 |
| 27 | 40 | 10 | 10 | 42.9 | 73.8 |

The various modifications and alterations of this invention will be apparent to those skilled in the art without departing from the scope and spirit of this invention and this invention should not be restricted to that set forth herein for illustrative purposes.

We claim:

1. A porous article comprising a porous substrate having a polymer deposited on the pore-defining surfaces thereof, the deposited polymer leaving the pores unblocked and said polymer having photochemically reactive groups capable of undergoing a substantially nonreversible chemical transformation to provide functional groups on the pore surfaces upon exposure to ultra-violet, visible or near infrared irradiation at wavelengths which avoid light-induced deterioration of the substrate.

2. A porous article according to claim 1 wherein the compound which is photochemically reactive has a diazo or diazoketone group.

3. A porous article according to claim 2 wherein the compound which is photochemically reactive is a polymer derived from a diamine and a di- or tri-sulfonyl chloride.

4. A porous article according to claim 1 wherein the amount of polymer formed on the substrate is equivalent to a mass gain of the substrate of at least about 5%.

5. A porous article according to claim 1 wherein the amount of polymer formed on the substrate is equivalent to a mass gain of the substrate of from 10 to 50%.

6. A porous article according to claim 1 wherein the pores of the porous substrate are formed by fibrils and the compound which is photochemically reactive forms a substantially continuous coating encapsulating the fibrils.

7. A porous article according to claim 1 wherein the porous substrate is polymeric, ceramic, cellulose, paper, glass, metallic, or carbonaceous material.

8. A porous article according to claim 7 wherein the polymeric porous substrate is a polyolefin, a polyhalo-olefin, a polyurethane, a polysulfone, a polyethersulfone, a polydialkenylphenylene oxide, a polyamide, a polyetherimide, or a combination thereof.

9. A porous article according to claim 7 wherein the polymeric porous substrate is a polyalkylene or a polysulfone.

10. A porous article according to claim 8 wherein the polyolefin porous substrate is a polyethylene or polypropylene.

11. A porous article according to claim 1 wherein the compound which is photochemically reactive is present in a layer on a major surface of the substrate.

12. A porous article according to claim 1 wherein the porous article is a microporous membrane.

* * * * *

UNITED STATES PATENT AND TRADEMARK OFFICE
CERTIFICATE OF CORRECTION

PATENT NO.   : 5,627,217
DATED        : May 6, 1997
INVENTOR(S)  : Rilling, Ken et al.

It is certified that error appears in the above-identified patent and that said Letters Patent is hereby corrected as shown below:

<u>Title page,</u>
Item [73], Assignee, after "Minnesota Mining and Manufacturing Company, St. Paul, Minn." please add -- and McMaster University, Hamilton, Ontario, Canada, as joint assignees --.

Signed and Sealed this

Sixth Day of January, 2004

JAMES E. ROGAN
*Director of the United States Patent and Trademark Office*